(12) United States Patent
Phillips et al.

(10) Patent No.: US 11,475,421 B2
(45) Date of Patent: Oct. 18, 2022

(54) ATM TRANSACTIONS USING BARCODES IN MULTIPLE STATES

(71) Applicant: Capital One Services, LLC, McLean, VA (US)

(72) Inventors: Jeremy J. Phillips, McLean, VA (US); Matthew B. Konopa, McLean, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/992,709

(22) Filed: Aug. 13, 2020

(65) Prior Publication Data

US 2022/0051210 A1 Feb. 17, 2022

(51) Int. Cl.
G06Q 20/10 (2012.01)
G07F 19/00 (2006.01)
G06Q 20/32 (2012.01)

(52) U.S. Cl.
CPC ..... *G06Q 20/1085* (2013.01); *G06Q 20/3223* (2013.01); *G06Q 20/3276* (2013.01); *G07F 19/203* (2013.01)

(58) Field of Classification Search
CPC ........... G06Q 20/1085; G06Q 20/3223; G06Q 20/3276; G07F 19/203
USPC ....................................................... 235/379
See application file for complete search history.

(56) References Cited

U.S. PATENT DOCUMENTS

| 8,332,320 | B2 | 12/2012 | Singh |
| 8,556,164 | B1 | 10/2013 | Freedman et al. |
| 8,769,304 | B2 | 7/2014 | Kirsch |
| 8,935,769 | B2 | 1/2015 | Hessler |
| 8,990,909 | B2 | 3/2015 | Kelley |
| 9,010,627 | B1 | 4/2015 | Prasad et al. |

(Continued)

FOREIGN PATENT DOCUMENTS

| TW | 689883 B1 | 4/2020 |
| WO | 0209001 A1 | 1/2002 |

(Continued)

OTHER PUBLICATIONS

"Cardless ATM" article captured Feb. 9, 2022 at https://www.mastercard.us/en-us/business/issuers/manage-your-consumer-needs/cardless-atm.html.*

(Continued)

*Primary Examiner* — Daniel A Hess
(74) *Attorney, Agent, or Firm* — Sterne, Kessler, Goldstein & Fox P.L.L.C.

(57) ABSTRACT

Disclosed herein are system, method, and computer program product embodiments for allowing completion of cardless ATM transactions at an ATM using a barcode that encodes an identifier for that ATM. A user of a mobile banking app may begin a transaction on their mobile device and, upon reaching a stage of the transaction where ATM access is needed (e.g., to withdraw physical cash), requests that the user visit an ATM to scan the barcode. When the mobile app scans the barcode, the ATM displaying the barcode is associated with the transaction, and completes the transaction (e.g., by dispensing cash). This barcode, while usable to identify the ATM for this purpose, also provides additional information that can be obtained by any barcode reader. This additional information may, for example, be a link to a website that provides an explanation about this service.

17 Claims, 8 Drawing Sheets

(56) References Cited

U.S. PATENT DOCUMENTS

| | | | |
|---|---|---|---|
| 9,311,632 B1* | 4/2016 | Dent | G06Q 20/3224 |
| 9,412,106 B2 | 8/2016 | Laracey | |
| 9,756,042 B2 | 9/2017 | Bicer | |
| 9,916,736 B2 | 3/2018 | Block et al. | |
| 9,922,370 B2 | 3/2018 | Kobres et al. | |
| 10,269,016 B2 | 4/2019 | Votaw et al. | |
| 10,445,711 B1* | 10/2019 | Arumugam | G06Q 20/385 |
| 10,984,419 B2 | 4/2021 | Ruparelia et al. | |
| 11,074,562 B1 | 7/2021 | Phillips | |
| 2011/0055084 A1 | 3/2011 | Singh | |
| 2013/0016173 A1 | 1/2013 | Johnson et al. | |
| 2013/0018788 A1 | 1/2013 | Johnson et al. | |
| 2013/0110717 A1 | 5/2013 | Kobres | |
| 2014/0263618 A1 | 9/2014 | McCarthy et al. | |
| 2014/0324610 A1 | 10/2014 | Ans et al. | |
| 2015/0058215 A1 | 2/2015 | Johnson | |
| 2016/0019510 A1 | 1/2016 | Guntupalli | |
| 2016/0162855 A1* | 6/2016 | Johnson | G06Q 20/363 705/43 |
| 2016/0180307 A1 | 6/2016 | Laracey | |
| 2017/0124544 A1 | 5/2017 | Recriwal et al. | |
| 2017/0337782 A1* | 11/2017 | Nelson, Jr. | G07F 19/205 |
| 2018/0060845 A1 | 3/2018 | Monaghan | |
| 2019/0073663 A1 | 3/2019 | Jamkhedkar et al. | |
| 2019/0108731 A1 | 4/2019 | Hazard et al. | |
| 2019/0213673 A1 | 7/2019 | McCarthy et al. | |
| 2020/0005263 A1 | 1/2020 | Arora et al. | |
| 2020/0356979 A1 | 11/2020 | Dadhaniya et al. | |
| 2021/0150497 A1 | 5/2021 | Phillips et al. | |
| 2021/0158315 A1* | 5/2021 | Phillips | H04L 63/0807 |
| 2021/0357926 A1 | 11/2021 | Laracey | |

FOREIGN PATENT DOCUMENTS

| | | | |
|---|---|---|---|
| WO | 2015011655 A1 | 1/2015 | |
| WO | 2018076443 A1 | 5/2018 | |
| WO | 2019058264 A1 | 3/2019 | |

OTHER PUBLICATIONS

Weisbaum, H., Banks putting human tellers in ATMS, NBC News, https://www.nbcnews.com/technology/banks-putting-human-tellers-atms-6C10791363; First Published Aug. 4, 2013.

Becky Yerak. "Talking with the ATM: Wintrust Financial is Unveiling 'Cardless Cash' Machines to Let Consumers Withdraw Money with Smartphones, a Move That Could Boost Security." Chicago tribune (1963) 2015: n pag. Print (Year: 2015).

"Diebold Delivers The Consumer Banking Experience of the Future with Two New Concept ATMs." Michigan Banker 27.12 (2015): 19—. Print. (Year: 2015).

Michael Scheibach. "The Case for Cardless Cash." Bank News 117.3 (2017): 26—. Print (Year: 2017).

Gamble, R. H. (2018). What's coming for ATMs? Credit Union Management, 41(11), 22-24. Retrieved from https://www.proquest.com/trade-journals/whats-coming-atms/docview/2126522498/se-2?accountid=14753 (Year: 2018).

Yurcan, B. (Mar. 20, 2018). Fifth third latest bank to enable cardless ATM access. American Banker Retrieved from https://www.proquest.com/newspapers/fifth-third-latest-bank-enable-cardless-atm/docview/2015118467 /se-2? accountid = 147 53 (Year: 2018).

Ahmad, N., A Aminurdin, M. R., & Mohd Helmy, A. W. (2016). AES card less automatic teller machine (ATM) biometric security system design using FPGA implementation. IOP Conference Series. Materials Science and Engineering, 160 (1) doi:http://dx.doi.org/10.1088/1757-899X/160/1/012113 (Year: 2016).

Paydiant gets patent for conducting transactions at ATMs using smartphone. (2014). Telecomworldwire, Retrieved from https://www.proquest.com/trade-journals/paydiant-gets-patent-conducting-transactions-at/docview /1491270632/se-2?accountid = 14 753 (Year: 2014).

Grosman, P. Wells to allow ATM withdrawals through mobile wallets. American Banker, [s. L], v. 182, n. 195, p. 1, 2017. Disponf vel em:https://search.ebscohost.com/login.aspx?direct=true&db=bth &AN = 125586390&site=ehost-live&scope=site. Acessoem: Mar. 18, 2022. (Year: 2017).

* cited by examiner

ATM TRANSACTIONS USING BARCODES IN MULTIPLE STATES

CROSS-REFERENCE TO RELATED APPLICATIONS

This application is related to application Ser. No. 16/877,101 entitled "Remote Activation of Kiosk to Serve Product or Release Cash to Customer," filed May 18, 2020, as well as application Ser. No. 16/877,091 entitled "Using a Third Party Dynamic QR Code on a Personal Mobile Device to Complete a Transaction at an ATM," filed May 18, 2020, both of which are incorporated by reference herein in their entireties.

BACKGROUND

Increasingly, banking has moved to apps on mobile devices. From a mobile app, users can perform many different types of banking transactions, such as checking balances and performing fund transfers between accounts. However, occasionally even users of mobile apps for banking must conduct transactions at an Automated Teller Machine (ATM) that cannot be completed on the mobile app, such as performing a cash withdrawal.

Accordingly, approaches are needed to further simplify transactions at ATMs for users of mobile apps.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, for conducting ATM transactions.

Many banks presently offer a mobile banking application experience that allows account holders to conduct a variety of transactions on their mobile devices, such as a smartphone. For example, an account holder may use the mobile banking application to transfer funds from a savings account to a checking account, or pay bills from their funds, all from the comfort of their mobile device from anywhere in the world.

Despite this flexibility, some transactions must still be conducted through an ATM (or through in-person banking with a human teller). In particular, cash withdrawals require physical access to the money, so interacting with a teller (human or ATM) is typically part of the process. When interacting directly with a teller, additional information about the customer must be provided in order to securely complete the transaction. This information is already known to the mobile banking application, which allows mobile transactions to be carried out more quickly.

In an embodiment, this mobile banking application can be extended to simplify, as much as possible, transactions that require interaction with a teller. By carrying out part of the transaction on a bank customer's own mobile device, the customer is able to minimize the information that needs to be conveyed to a teller (e.g., by speaking to a human teller or by typing instructions into an ATM), reducing the amount of time spent physically interacting with the teller. For example, a bank customer can avoid producing a bank-issued ATM, debit, or credit card, and physically inserting the same into an ATM or handing over credentials to a human teller.

This efficient interaction has significant consequences, such as reducing the number of tellers needed at a given location (as each customer spends less time with a teller—fewer human tellers are needed, and fewer ATMs need to be installed) and reducing the amount of physical interaction with a teller (which has consequences for cleaning routines and disease transmission).

Figure 1:
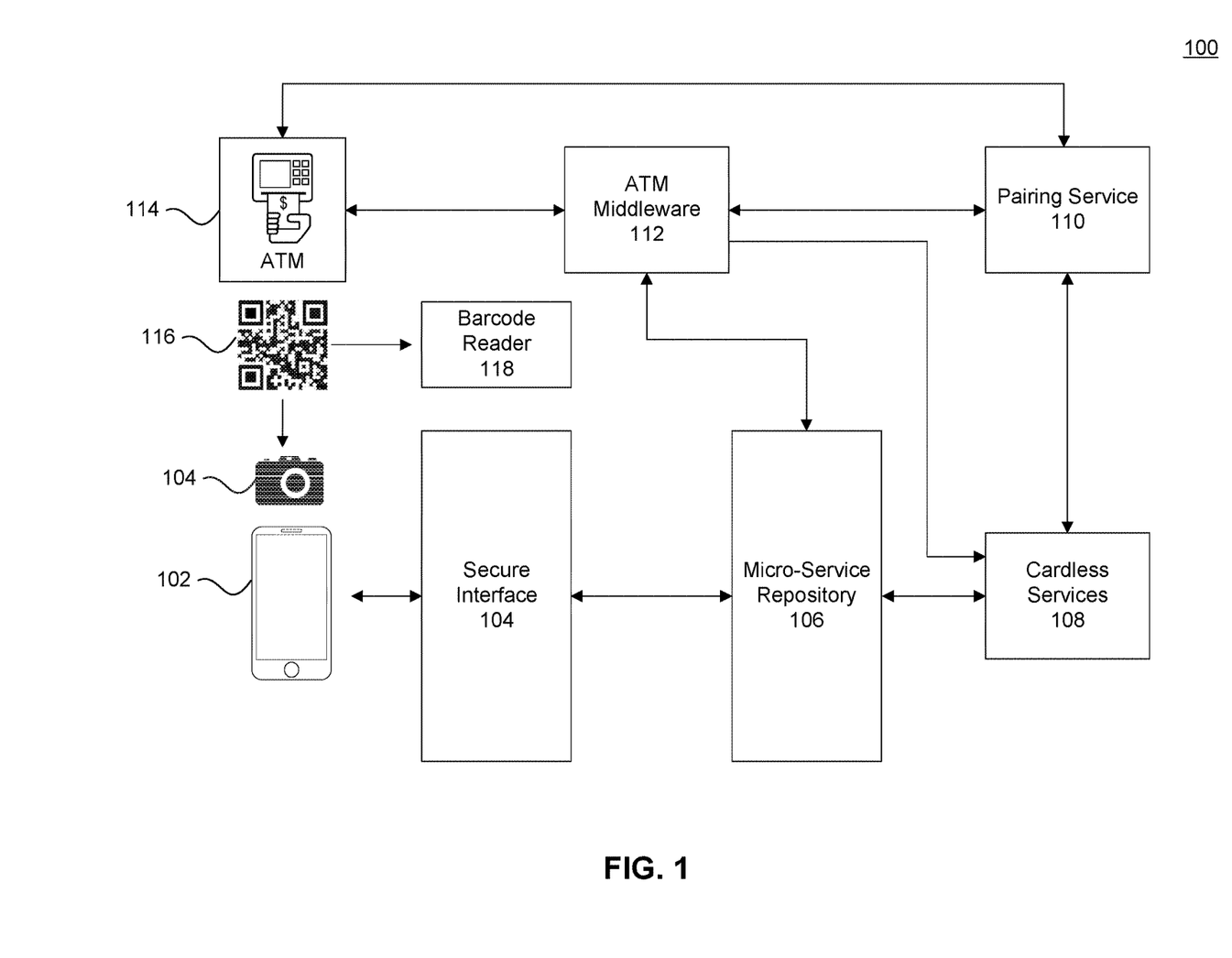
FIG. 1 illustrates a cardless ATM system, in accordance with an embodiment.

FIG. 1 illustrates a cardless ATM system 100, in accordance with an embodiment. In an embodiment, mobile device 102 is used by an account holder of a banking institution to conduct online banking. Specifically, mobile device 102 will typically have a mobile application ("app") installed thereon and usable for interacting with the banking institution for performing banking transactions on a user account holder's accounts.

Mobile device 102 interacts with the banking institution through a secure interface 104, in accordance with an embodiment. Secure interface 104 provides facilities for securely communicating with the banking institution's backend systems to conduct transactions, and also protects the banking institution's backend systems from improper access attempts (e.g., distributed denial of service (DDoS) attacks, injection attacks, etc.)

In an embodiment, interaction with the banking institution's backend systems through secure interface 104 is accomplished through a variety of micro-services provided by micro-service repository 106. For example, cardless services 108 allow mobile device 102 to interact with an ATM 114 without the need to have a physical ATM card as an authentication mechanism for the account holder.

Specifically, cardless services 108 allow the user account holder to authenticate themselves to the banking institution using authentication procedures within an app installed on mobile device 102. By way of non-limiting example, this may include a username and password based login, biometric recognition, access key, and other authentication mechanisms, including the use of multiple authentication mechanisms in a multi-factor authentication scheme. A skilled artisan will appreciate that a variety of authentication mechanisms may be employed at mobile device 102 in order to ensure that the user is authorized to access their specific account through cardless services 108.

In an embodiment, an authenticated user on mobile device 102 may request a transaction through cardless services 108 that needs to be serviced through ATM 114 (such as a cash withdrawal). Since the authenticated user is known to the banking institution as having proper access to perform the transaction, even without the use of an ATM card, cardless services 108 can inform ATM 114 that the authenticated user is permitted to complete the transaction at ATM 114.

In order to complete the transaction, cardless services 108 pairs the transaction to ATM 114 to allow completion of the transaction at ATM 114. And if, with pairing complete through pairing service 110, cardless services 108 issues a request for ATM 114 to perform a specific transaction (e.g., providing cash to complete a cash withdrawal transaction), the instructions can be provided through ATM middleware 112 to direct the behavior of ATM 114.

In accordance with an embodiment, pairing service 110 handles pairing of transactions from mobile device 102 with ATM 114 through the use of a barcode or other unique identifying information obtained from ATM 114 and provided through mobile device 102 as confirmation. For example, ATM 114 may display a barcode, such as QR code 116, on its screen. This barcode includes an identifier associated with ATM 114. When mobile device 102 has prepared a transaction for performance through cardless services 108, the mobile app executing on mobile device 102 may instruct the authenticated user to visit ATM 114 to complete the transaction. A skilled artisan will recognize that, although the disclosure herein is presented principally by way of barcodes (which include special cases of barcodes, such as Quick Response (QR) codes), other forms of coding may be used in place of barcodes to equivalent effect.

In this embodiment, upon arriving at ATM 114, the user of mobile device 102 is presented with QR code 116 on the display screen of ATM 114. The mobile app executing on mobile device 102 may present the user with an option for obtaining this QR code 116 (or other code) from the ATM 114. For example, the mobile app may access a camera feature to allow the user to scan QR code 116 using a camera 103 built into mobile device 102. The mobile device 102 sends this QR code to cardless services 108 and on to pairing service 110, which recognizes the identifier for ATM 114 in scanned QR code 116. Accordingly, pairing service 110 is able to pair the transaction initiated from mobile device 102 with ATM 114 specifically on the basis of the identifier.

In a further embodiment, QR code 116 (or other form of barcode) may be read by a barcode reader 118. Barcodes, such as QR codes, that are formed in accordance with a specific standard are commonly readable by any reader that itself conforms to the barcode standards. For example, if barcode reader 118 is capable of reading QR codes such as QR code 116, then barcode reader 118 would be able to obtain raw data present in any such QR code. Accordingly, a skilled artisan would understand that barcode reader 118 is any form of device capable of reading a barcode (such as QR code 116) displayed on ATM 114, and may include devices such as a handheld barcode scan tool or a mobile phone with an installed application capable of reading and processing the barcode.

Figure 2A:
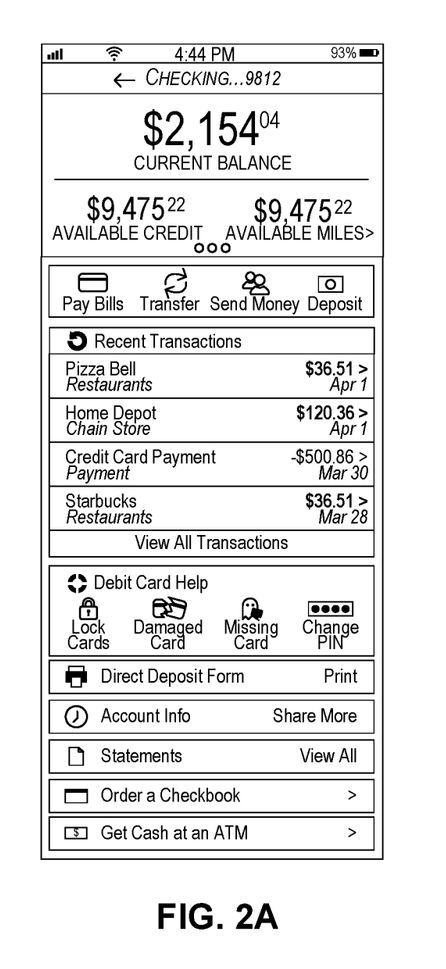
FIGS. 2A through 2H illustrate a wireframe of a mobile device ATM fulfillment process, in accordance with an embodiment.
Figure 2B:
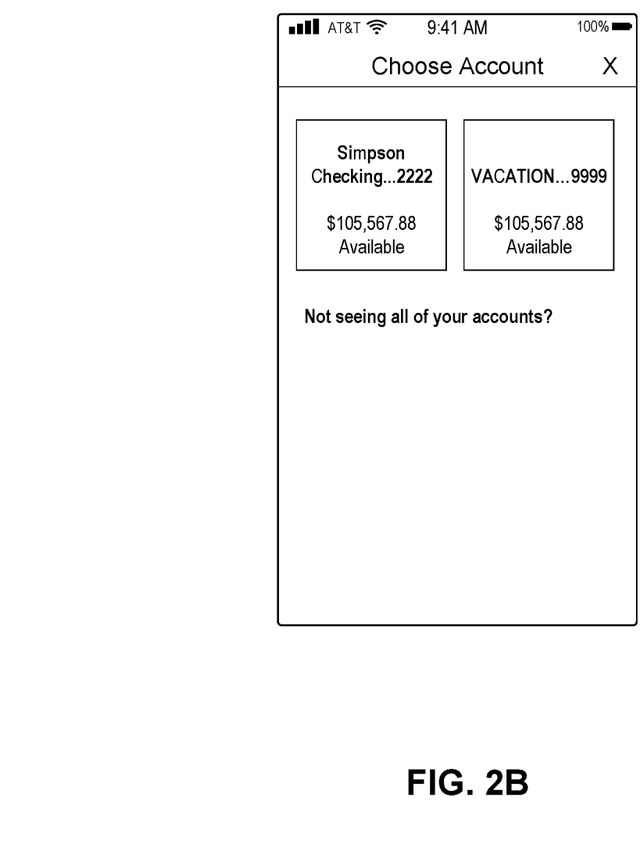
Figure 2C:
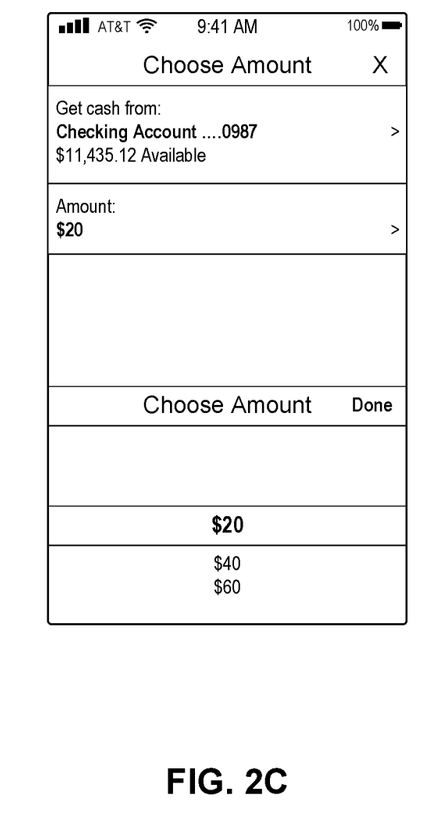
Figure 2D:
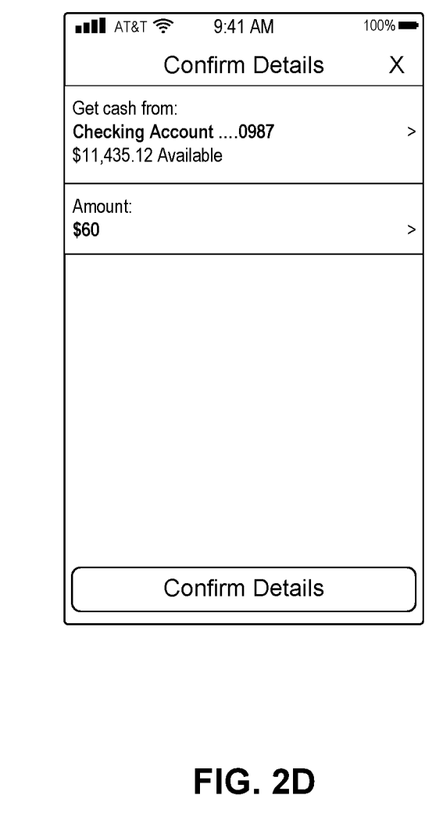

FIGS. 2A through 2H illustrate a wireframe of a mobile device ATM fulfillment process, in accordance with an embodiment. FIG. 2A shows an exemplary home screen for a mobile app used for banking on a mobile device, such as mobile device 102 of FIG. 1. From this screen, a user of the mobile app may select a transaction that requires an ATM for fulfillment—in this case, "Get Cash at an ATM." FIG. 2B shows an exemplary screen allowing the user to select an account from which to perform the ATM withdrawal. FIG. 2C shows an exemplary screen for selecting an amount for the ATM cash withdrawal, while FIG. 2D shows an exemplary screen for confirming details of the withdrawal (including the account and the amount selected).

Figure 2E:
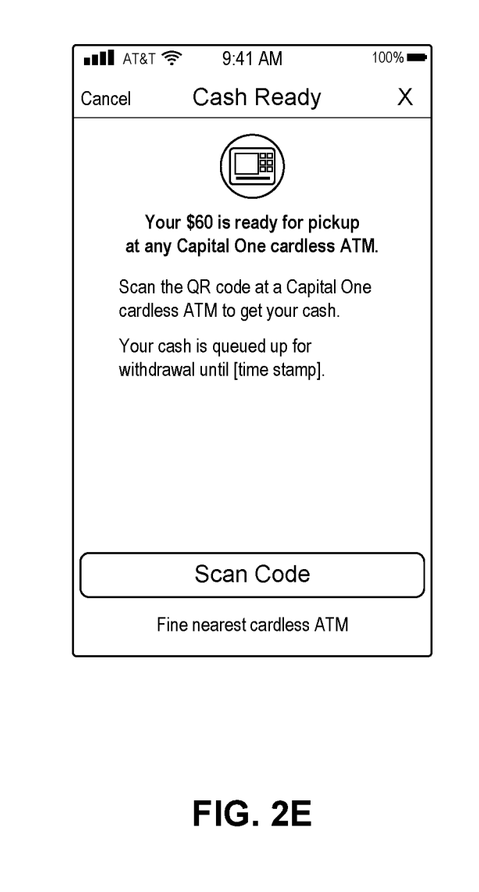
Figure 2F:
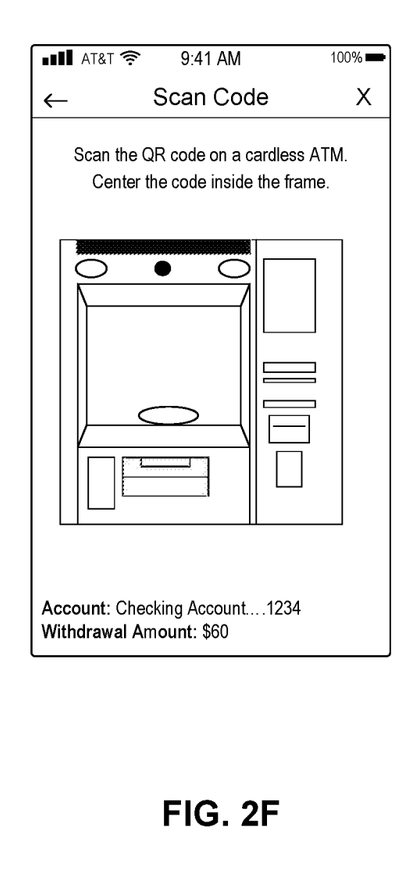
Figure 2G:
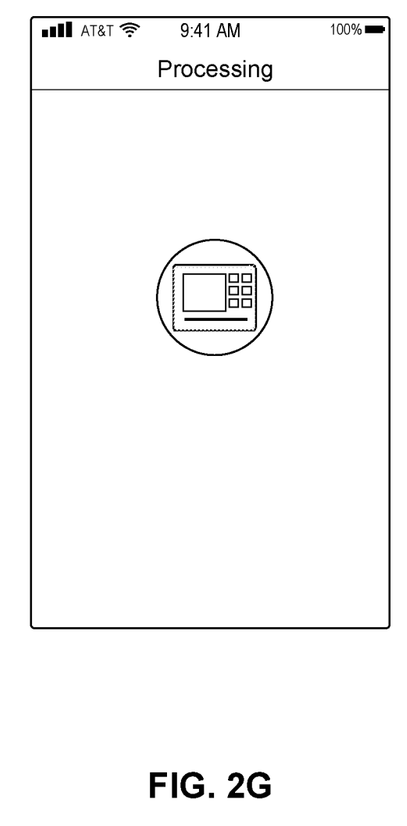
Figure 2H:
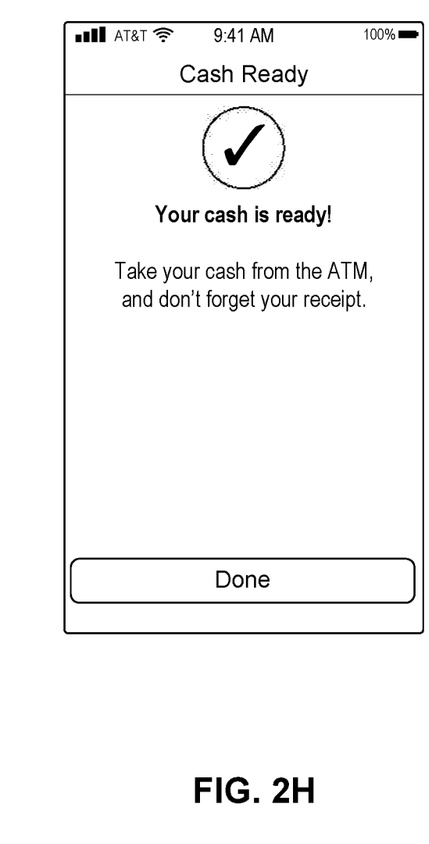

FIG. 2E shows an exemplary screen notifying the user that the transaction has been approved, and is ready to be completed at an ATM. This screen also provides an option allowing the user to scan a code, which, once selected, navigates to the exemplary screen of FIG. 2F. The exemplary screen of FIG. 2F shows a camera feature allowing the user to approach the ATM with their mobile device to scan the code (e.g., a QR code) shown on the ATM display. And the exemplary screen of FIG. 2H shows a confirmation screen indicating that the transaction has been completed by the ATM.

As discussed in the context of FIG. 1, in an embodiment pairing service 110 uses an identifier for ATM 114 obtained by mobile device 102 (e.g., by scanning QR code 116 with an embedded identifier, using camera 103 of mobile device 102) to pair ATM 114 with the transaction provided by mobile device 102. In this embodiment, the exemplary screens of FIGS. 2A-2E illustrate the process of preparing the transaction for fulfillment by ATM 114, and FIGS. 2F-2H illustrate the process of pairing the specific ATM 114 to the transaction of mobile device 102 by scanning QR code 116 using camera 103 of mobile device 102.

Figure 3:
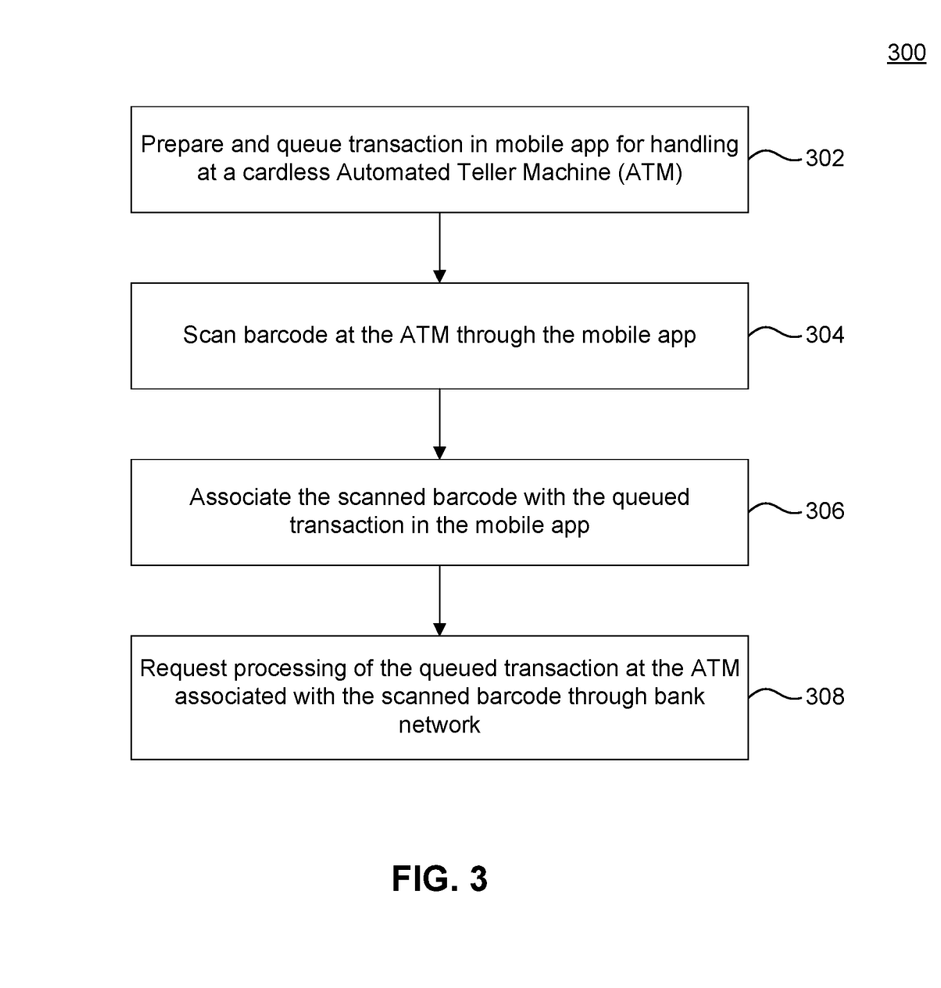
FIG. 3 is a flowchart illustrating steps by which a transaction from a mobile app may be fulfilled by an ATM, in accordance with an embodiment.

FIG. 3 is a flowchart 300 illustrating steps by which a transaction from a mobile app may be fulfilled by an ATM, in accordance with an embodiment. It is to be appreciated the process may not execute all steps shown or in the order shown, and may execute additional steps.

In this embodiment the process begins at step 302, where a transaction is prepared and queued in a mobile app for processing at an ATM. As previously discussed, this transaction may be, for example, an ATM withdrawal. A user of the mobile app, who is an account holder at a banking institution, may begin this ATM withdrawal transaction within the mobile app. The mobile app would, in an embodiment, authenticate the user as the account holder and, based on this authentication, allow the ATM withdrawal transaction to take place. In an embodiment, the banking institution may receive this queued transaction and approve it in advance of interaction with the ATM.

However, in an embodiment, to complete the ATM withdrawal, the user would take over an ATM to be used for the physical cash withdrawal.

At step 304, the user approaches the ATM and scans a barcode at the ATM using the mobile app, in accordance with an embodiment. This barcode includes some form of identifier for the ATM. As previously discussed, this barcode may be, for example, a QR code, although a skilled artisan would appreciate that other methods of encoding an identifier for the ATM may be used and other methods of transmitting the same to the mobile app may also be used.

At step 306, the scanned barcode (e.g., the identifier for the ATM from the barcode) is associated with the queued transaction. And at step 308, processing of the queued transaction is requested at the ATM associated with the identifier, through the bank network.

The approaches to using a mobile banking app to complete a transaction at an ATM are described in further detail at application Ser. No. 16/877,101 entitled "Remote Activation of Kiosk to Serve Product or Release Cash to Customer," filed May 18, 2020, as well as application Ser. No. 16/877,091 entitled "Using a Third Party Dynamic QR Code on a Personal Mobile Device to Complete a Transaction at an ATM," filed May 18, 2020, both of which are incorporated by reference herein in their entireties.

While the barcode presented on the display of the ATM has been described thus far as having embedded therein an identifier for the ATM on which it is displayed, the barcode can contain additional information as well, in accordance with an embodiment.

In particular, in addition to providing the identifier for the ATM, the barcode may also include information usable to direct devices capable of reading the information (as encoded in the barcode) to perform additional operations. For example, the barcode information may encode a URL for a website, in an embodiment. In this scenario, the ATM would display the barcode that encodes both the ATM identifier and the URL together, such that a user of the mobile app completing a transaction may scan the barcode in order to obtain the ATM identifier and complete the transaction at that ATM. But, additionally, a barcode reader capable of interpreting the barcode (e.g., a standard camera app on a mobile device capable of reading URLs encoded in a QR code, or any other form of barcode reader such as barcode reader 118 of FIG. 1) may scan the same barcode to obtain the URL.

By way of non-limiting example, a QR code may be generated that directs a barcode reader to the URL. Since the QR code will be interpreted as a URL, in one embodiment the ATM identifier is encoded into the URL, which is in turn encoded into the QR code. For example, the URL "http://www.bankname.com/?ATM=205" would cause a barcode reader to direct a browser to "bankname.com", while also encoding "ATM=205". This ATM identifier could be used by a mobile banking app to complete transactions at the corresponding ATM, as previously discussed, while being able to access the URL otherwise. The URL (or other additional information) can be combined (either encoded or unencoded) with the ATM identifier in other ways—the barcode is read by the barcode reader and the resulting data can be passed to the mobile banking app for processing as appropriate.

The barcode reader may use a URL retrieved from the barcode to open the website found at that URL within a web browser. In an embodiment, the website may inform a user of the barcode reader of the purpose of the barcode. For example, if an ATM is displaying a barcode that a mobile banking app user can scan to complete a transaction (using the ATM identifier embedded in a QR code, for example), the also-embedded URL might direct to a web page hosted by the bank that provides information about a given branch, such as hours of operation, as well as information about how to operate the ATM using the mobile app and QR code.

In a further embodiment, the website may direct the user to additional related services, such as a download link for the mobile app or a sign up page for enrolling as a customer of a banking institution. In this manner, a mobile device user with a standard barcode reading app can be used to visit the URL associated with the QR code by scanning the QR code without any prior knowledge of, or interaction with, the mobile banking app.

It is also possible for the URL to augment the banking experience of a customer of the bank. In an additional embodiment, the website may be a website within a secured area of the banking institution. If the user is authenticated to the banking institution (for example, a user who is already authenticated via the mobile banking app or on the bank's website in their mobile browser), the website may be presented in full to the user, and may include the ability to perform banking transactions through a browser-based transaction page. And, if the user is not authenticated to the banking institution, a message indicating a lack of access may be presented, or the user may be redirected to a public website with additional information (e.g., further instructions, instructions for signing up for an account, a login page, etc.), as described above.

In this manner, a single barcode presented on an ATM screen can provide different experiences by using a single URL that links to a page with different behavior depending on whether the mobile device is or is not authenticated to the corresponding website for the URL, and that also embeds the ATM identifier within the URL.

The encoded information, in addition to the ATM identifier, may be used in a variety of additional ways. In an additional embodiment, the encoded information within the barcode may contain a link (e.g., a URL or a device-specific instruction) directing the barcode reader to access an app store landing page for the mobile app. For example, if a standard camera app on a mobile device with QR code reading capabilities is used to scan a QR code displayed on the ATM, the camera app may detect the link within the QR code as a link to an app store page, and open that link within the mobile device's app store to allow the mobile device user an opportunity to download the needed mobile app.

In another embodiment, the mobile app used for banking on the mobile device may itself have the ability to scan the barcode apart from when a transaction is pending. In this case, the mobile device may allow the user to take over the ATM and begin the transaction directly at the ATM, again by associating the ATM identifier encoded by the barcode with the mobile device. For example, the mobile app may be used to scan the QR code and direct the ATM to perform a cash withdrawal, without first staging the transaction at the mobile app. This approach allows for hands-free interaction with the ATM through the mobile app, by sending instructions from the mobile app to the ATM on the basis of the ATM identifier specified within the QR code (or other barcode).

Figure 4:
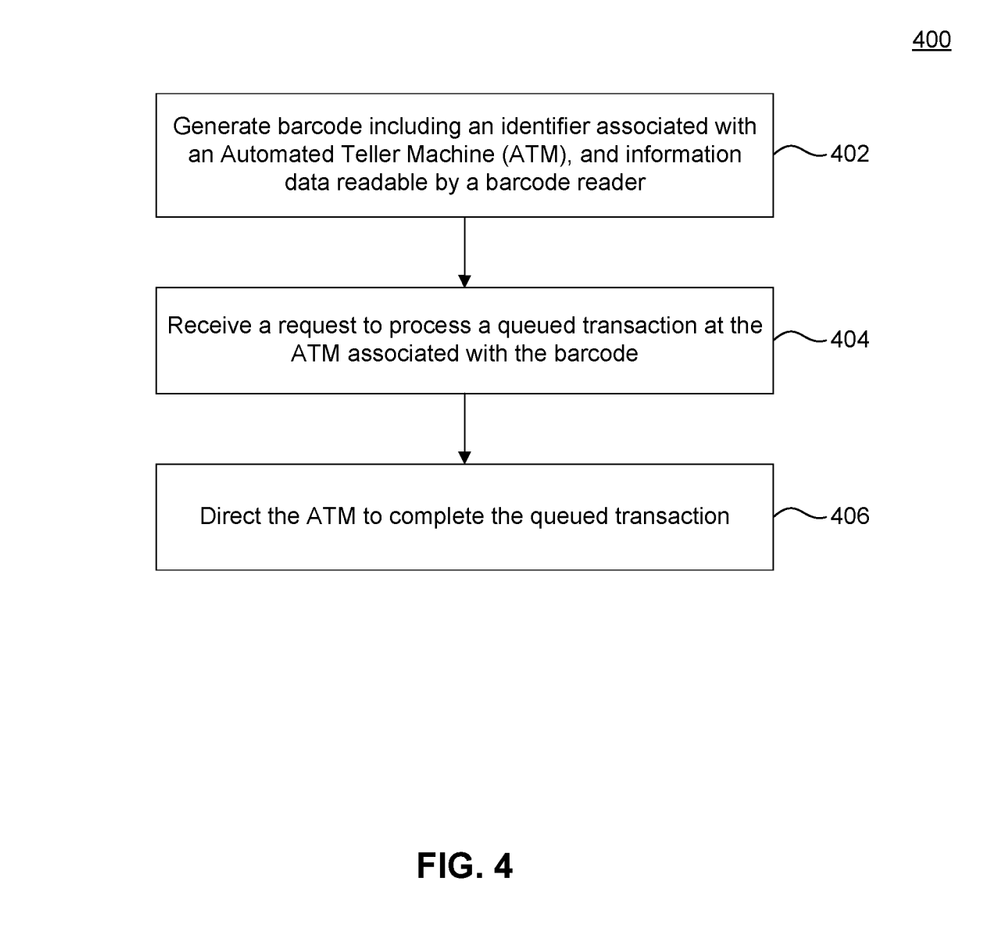
FIG. 4 is a flowchart illustrating steps by which a banking institution backend pairs a transaction with an ATM, in accordance with an embodiment.

FIG. 4 is a flowchart 400 illustrating steps by which a banking institution backend pairs a transaction with an ATM, in accordance with an embodiment. It is to be appreciated the process may not execute all steps shown or in the order shown, and may execute additional steps.

In an embodiment, at step 402 a barcode is generated that includes an identifier associated with the ATM, as well as information data readable by a barcode reader (e.g., the URL to an explanatory website, as discussed above).

At step 404, the banking institution backend receives a request to process a queued transaction at the ATM, in accordance with an embodiment. By way of non-limiting example, a pairing service, such as pairing service 110 of FIG. 1, is configured to pair a queued transaction received from a mobile banking app on a mobile device with the ATM on the basis of the ATM identifier encoded within the barcode. And, at step 406, the ATM is directed to complete the queued transaction with which it has been paired.

In accordance with an embodiment, the ATM identifier encoded within the barcode is regenerated in order to protect against attacks where a barcode from a remote ATM with its corresponding identifier is presented to the mobile device at a distant different location. By way of non-limiting example, the ATM identifier is regenerated periodically and the new identifier is mapped to the ATM. When the ATM identifier is regenerated, the barcode is regenerated to reflect this change. Accordingly, ATMs displaying these barcodes will change barcodes when a change to the ATM identifier occurs.

As further protection from attacks, location services within the mobile device performing the transaction may be used to determine whether the location of the mobile device is within a sufficiently close distance to the ATM corresponding to the ATM identifier in a barcode scanned by the mobile device. By way of non-limiting example, if the mobile device scans a QR code to complete a transaction, but the ATM identifier within that QR code corresponds to an ATM located 100 miles from the mobile device, the transaction may not be permitted to complete on the basis of this disparity.

In effect, the barcodes presented on ATMs that enable cardless access and cardless completion of transactions that have been started on a mobile app on a mobile device can also be used to provide information usable by non-participants in cardless ATM banking.

Figure 5:
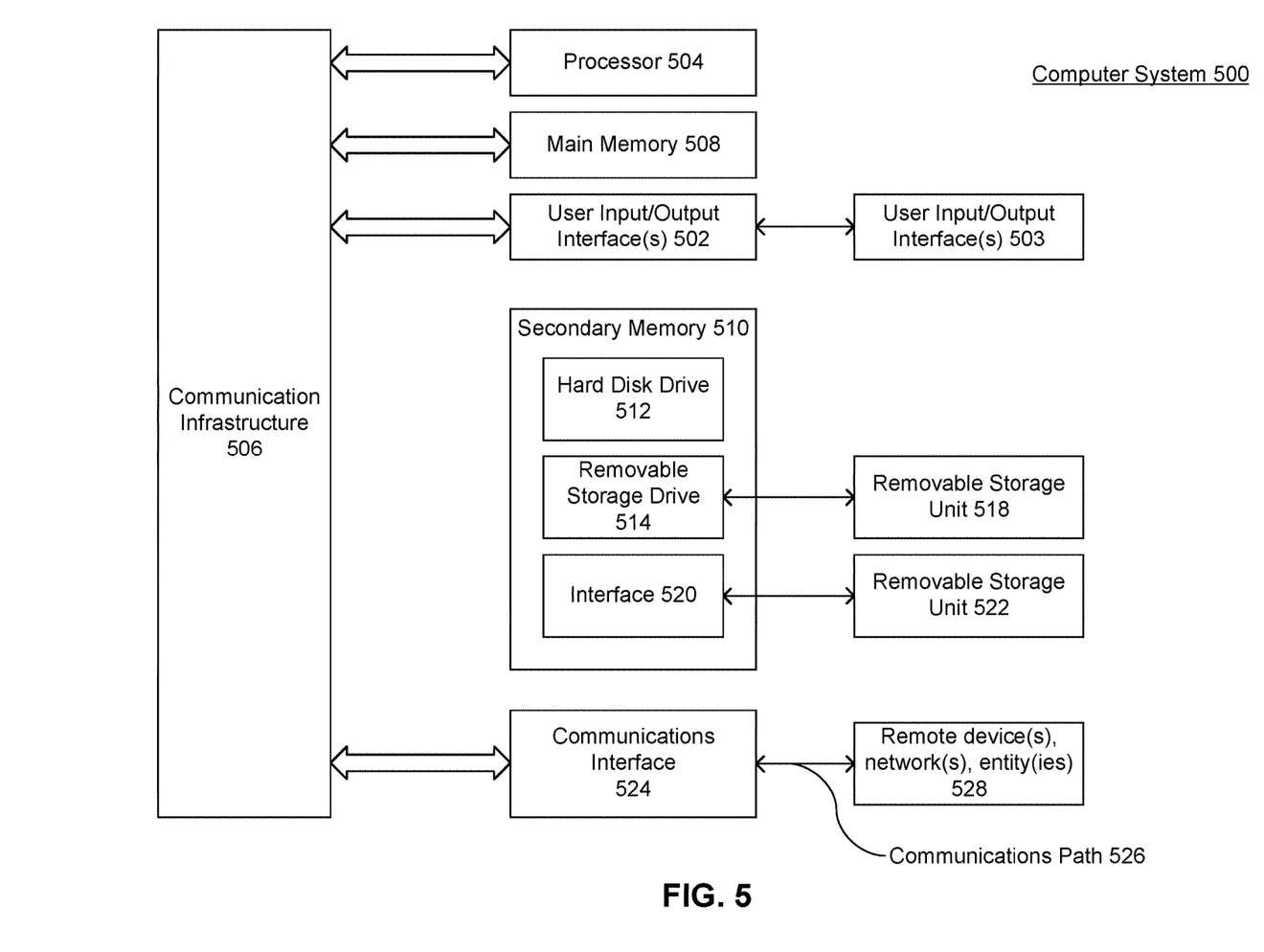
FIG. 5 is an example computer system useful for implementing various embodiments.

Various embodiments may be implemented, for example, using one or more well-known computer systems, such as computer system 500 shown in FIG. 5. One or more computer systems 500 may be used, for example, to implement any of the embodiments discussed herein, as well as combinations and sub-combinations thereof.

Computer system 500 may include one or more processors (also called central processing units, or CPUs), such as a processor 504. Processor 504 may be connected to a communication infrastructure or bus 506.

Computer system 500 may also include user input/output device(s) 503, such as monitors, keyboards, pointing devices, etc., which may communicate with communication infrastructure 506 through user input/output interface(s) 502.

One or more of processors 504 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 500 may also include a main or primary memory 508, such as random access memory (RAM). Main memory 508 may include one or more levels of cache. Main memory 508 may have stored therein control logic (i.e., computer software) and/or data.

Computer system 500 may also include one or more secondary storage devices or memory 510. Secondary memory 510 may include, for example, a hard disk drive 512 and/or a removable storage device or drive 514. Removable storage drive 514 may be a floppy disk drive, a magnetic tape drive, a compact disk drive, an optical storage device, tape backup device, and/or any other storage device/drive.

Removable storage drive 514 may interact with a removable storage unit 518. Removable storage unit 518 may include a computer usable or readable storage device having stored thereon computer software (control logic) and/or data. Removable storage unit 518 may be a floppy disk, magnetic tape, compact disk, DVD, optical storage disk, and/any other computer data storage device. Removable storage drive 514 may read from and/or write to removable storage unit 518.

Secondary memory 510 may include other means, devices, components, instrumentalities or other approaches for allowing computer programs and/or other instructions and/or data to be accessed by computer system 500. Such means, devices, components, instrumentalities or other approaches may include, for example, a removable storage unit 522 and an interface 520. Examples of the removable storage unit 522 and the interface 520 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 500 may further include a communication or network interface 524. Communication interface 524 may enable computer system 500 to communicate and interact with any combination of external devices, external networks, external entities, etc. (individually and collectively referenced by reference number 528). For example, communication interface 524 may allow computer system 500 to communicate with external or remote devices 528 over communications path 526, which may be wired and/or wireless (or a combination thereof), and which may include any combination of LANs, WANs, the Internet, etc. Control logic and/or data may be transmitted to and from computer system 500 via communication path 526.

Computer system 500 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 500 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 500 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 500, main memory 508, secondary memory 510, and removable storage units 518 and 522, as well as tangible articles of manufacture embodying any combination of the foregoing. Such control logic, when executed by one or more data processing devices (such as computer system 500), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 5. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer implemented method, comprising:
   encoding, by one or more computing devices, an identifier associated with an Automated Teller Machine (ATM) and information data into a barcode;
   receiving, by the one or more computing devices, a request from a mobile app to process a queued transaction comprising a cash withdrawal request at the ATM, the queued transaction having been prepared by the mobile app up to a stage of the queued transaction where access to the ATM is needed to complete the queued transaction and having been approved by a bank affiliated with the ATM, and the request including the identifier obtained by the mobile app from the barcode using a barcode reader; and
   directing, by the one or more computing devices, the ATM associated with the barcode to complete the queued transaction based on the identifier obtained by the mobile app by dispensing cash responsive to the cash withdrawal request.

2. The computer implemented method of claim 1, further comprising:
   instructing the ATM, by the one or more computing devices, to display the barcode.

3. The computer implemented method of claim 1, wherein the encoding comprises:
   encoding, by the one or more computing devices, the identifier and the information data into the barcode as a QR code, wherein the information data directs the barcode reader to a website.

4. The computer implemented method of claim 3, wherein the website comprises a download link for the mobile app.

5. The computer implemented method of claim 3, wherein the website is restricted to members of a bank affiliated with the ATM and redirects non-members of the bank to an unrestricted website or to a download link for the mobile app.

6. The computer implemented method of claim 1, further comprising:
   regenerating, by the one or more computing devices, the barcode prior to receiving the request to process the queued transaction from the mobile app.

7. A system, comprising:
   a memory configured to store operations; and
   one or more processors configured to perform the operations, the operations comprising:
      encoding an identifier associated with an Automated Teller Machine (ATM) and information data into a barcode,
      receiving a request from a mobile app to process a queued transaction comprising a cash withdrawal request at the ATM, the queued transaction having been prepared by the mobile app up to a stage of the queued transaction where access to the ATM is needed to complete the queued transaction and having been approved by a bank affiliated with the ATM, and the request including the identifier obtained by the mobile app from the barcode using a barcode reader, and
      directing the ATM associated with the barcode to complete the queued transaction based on the identifier obtained by the mobile app by dispensing cash responsive to the cash withdrawal request.

8. The system of claim 7, the operations further comprising:
   instructing the ATM to display the barcode.

9. The system of claim 7, wherein the encoding comprises:
   encoding the identifier and the information data into the barcode as a QR code, wherein the information data directs the barcode reader to a website.

10. The system of claim 9, wherein the web site comprises a download link for the mobile app.

11. The system of claim 9, wherein the website is restricted to members of a bank affiliated with the ATM and redirects non-members of the bank to an unrestricted website or to a download link for the mobile app.

12. The system of claim 7, the operations further comprising:

regenerating the barcode prior to receiving the request to process the queued transaction from the mobile app.

13. A computer readable storage device having instructions stored thereon, execution of which, by one or more processing devices, causes the one or more processing devices to perform operations comprising:

encoding an identifier associated with an Automated Teller Machine (ATM) and information data into a barcode;

receiving a request from a mobile app to process a queued transaction comprising a cash withdrawal request at the ATM, the queued transaction having been prepared by the mobile app up to a stage of the queued transaction where access to the ATM is needed to complete the queued transaction and having been approved by a bank affiliated with the ATM, and the request including the identifier obtained by the mobile app from the barcode using a barcode reader; and directing the ATM associated with the barcode to complete the queued transaction based on the identifier obtained by the mobile app by dispensing cash responsive to the cash withdrawal request.

14. The computer readable storage device of claim 13, the operations further comprising:

instructing the ATM to display the barcode.

15. The computer readable storage device of claim 13, wherein the encoding comprises:

encoding the identifier and the information data into the barcode as a QR code, wherein the information data directs the barcode reader to a website.

16. The computer readable storage device of claim 15, wherein the website is restricted to members of a bank affiliated with the ATM and redirects non-members of the bank to an unrestricted website or to a download link for the mobile app.

17. The computer readable storage device of claim 13, the operations further comprising:

regenerating the barcode prior to receiving the request to process the queued transaction from the mobile app.

* * * * *